Oct. 10, 1944.    R. F. CLEMENS    2,359,748
TREATMENT OF WATER SOFTENING SLUDGE
Filed April 23, 1942
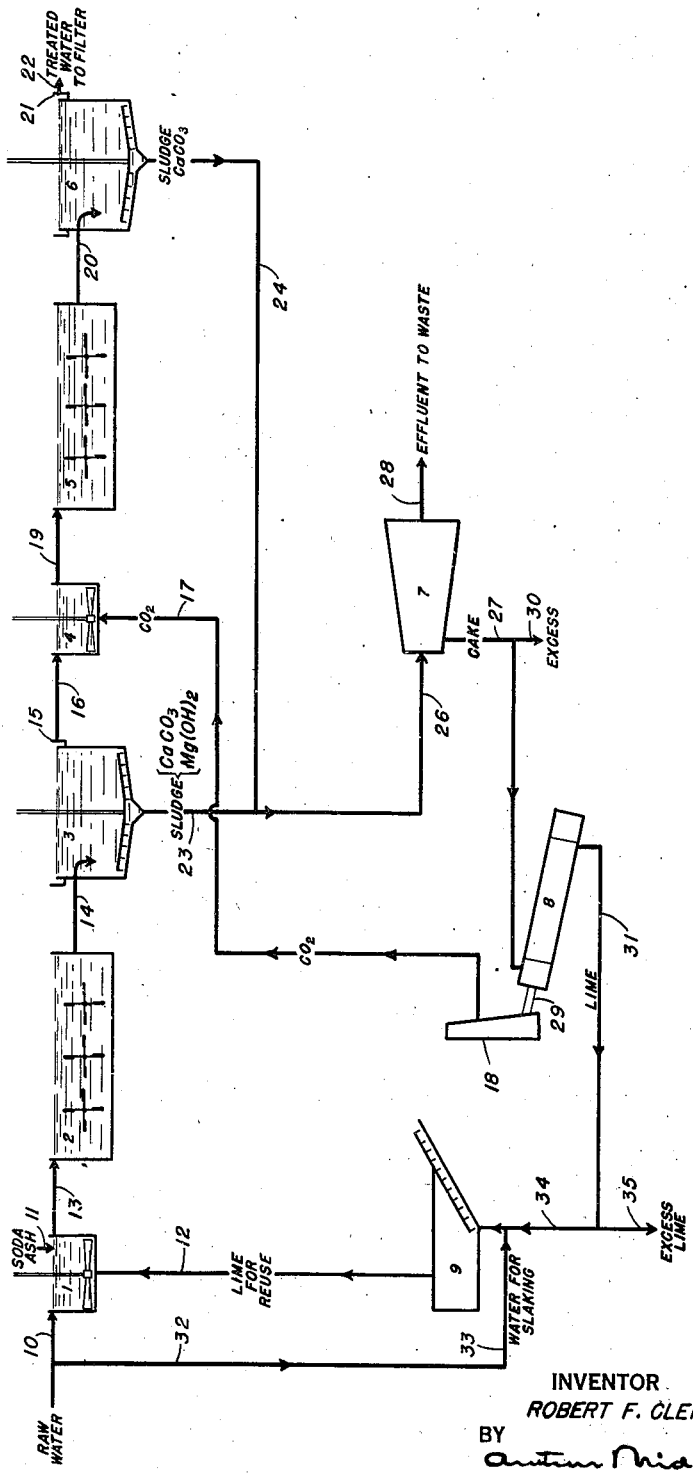
INVENTOR
ROBERT F. CLEMENS
BY
ATTORNEY Patented Oct. 10, 1944

2,359,748

UNITED STATES PATENT OFFICE 2,359,748

TREATMENT OF WATER SOFTENING SLUDGE

Robert F. Clemens, Union City, N. J., assignor to The Dorr Company, New York, N. Y., a corporation of Delaware Application April 23, 1942, Serial No. 440,119

10 Claims. (Cl. 210—16)

The present invention relates to a process and system for the softening of water. More particularly, it has to do with the treatment of hard water.

It is well known that in certain types of water there are present therein temporary hardness imparting components as exemplified by calcium bicarbonate—$Ca(HCO_3)$—and magnesium bicarbonate—$Mg(HCO_3)$—, as well as permanent hardness imparting components as exemplified by calcium chloride—$CaCl_2$—, calcium sulfate—$CaSO_4$—, calcium nitrate—$Ca(NO_3)_2$—, magnesium chloride—$MgCl_2$—, and magnesium sulfate—$MgSO_4$—.

For the softening of water having both temporary and permanent hardness imparting components dissolved therein it is generally customary to treat such water with lime (calcium oxide) and soda ash (sodium carbonate) in quantities such as to cause the conversion of these dissolved components into the form of insoluble calcium carbonate and magnesium hydroxide precipitates. These insoluble precipitates are removed from the treated water as a sludge or slurry as by sedimentation, filtration or the like, and discarded.

It has been found that by introducing such sludge or slurry containing interspersed insoluble calcium carbonate and magnesium hydroxide precipitates in a centrifuge capable upon operation of inducing centrifugal forces of such magnitude and intensity as to classify and throw out from the liquid containing solids suspended therein that fraction of solids whose particles are larger than those of the solids desired to be retained in suspension and causing the sludge to be subjected to such forces, whereby most of the particles of the calcium carbonate precipitate separate out and collect as concentrated calcium carbonate in a cake while the particles constituting the magnesium hydroxide precipitate tend to concentrate in the solids fraction of the effluent. The cake thus formed with calcium carbonate concentrate therein is in a physical condition such that upon calcination yields lime suitable for reuse in the process.

Accordingly, an object of the present invention is to provide a process and system for softening water in which calcium carbonate concentrate, suitable for production therefrom of the lime subsequently required for use in the process, is physically and mechanically obtained from the calcium carbonate precipitate containing sludge.

Another object of the present invention is to provide a process and system for softening water wherein the calcium carbonate thus obtained is caused to be separated out of the sludge containing it in a form such as to yield, upon calcination, lime suitable for reuse in the process.

A further object of the present invention is to provide a process and system for softening water in which the sludge containing calcium carbonate and magnesium hydroxide precipitates is centrifuged to effect a mechanical separation and concentration of the calcium carbonate in a form such as to be converted upon calcination into lime suitable for reuse in the process.

A still further object of the present invention is to provide a process and system for softening water wherein the sludge containing particles of calcium carbonate and magnesium hydroxide precipitates is subjected to centrifugal action of such nature as to cause calcium carbonate particles to be separated out in a state such as to collect in a cake wherein calcium carbonate is concentrated in the solids fraction of the cake and to cause magnesium hydroxide particles to be concentrated in the solid fraction of the resulting effluent suspension.

Other features of novelty and objects will be apparent from the following description taken in connection with the drawing, wherein the single figure is a diagrammatic illustration of a system for carrying out the treatment according to the present invention.

Referring to the drawing, raw or hard water to be treated is introduced into the system through the line 10 and flows inwardly through such line into a mixer 1. Soda ash or sodium carbonate is supplied to the mixer as indicated by the numeral 11. To the mixer there is introduced lime as lime hydrate or calcium hydroxide, it being supplied through the line 12. The lime as lime hydrate and soda ash thus introduced are sufficient for the requirements of the process. It is preferred, however, that the lime be in excess over such requirements in order that all of the magnesium content may be precipitated out at this stage or point. After the process has been initially started, the source of the lime for use in making the lime hydrate subsequently required in the process is the calcium carbonate mechanically obtained from the previously formed sludge, the carbonate being in a condition as to produce upon calcination lime or calcium oxide suitable for use in the process. The treatment of the sludge resulting in the extraction of such calcium carbonate constitutes a major aspect of the invention and will hereinafter be described in detail.

The water while in the mixer 1 is subjected to the action of both the lime hydrate and soda ash. The lime hydrate or calcium hydroxide reacts with the temporary hardness imparting components as exemplified by calcium bicarbonate —$Ca(HCO_3)$— and magnesium bicarbonate —$Mg(HCO_3)$—to form a certain amount of calcium carbonate—$CaCO_3$—, a certain amount of magnesium carbonate—$MgCO_3$—, and a certain amount of magnesium hydroxide—$Mg(OH)_2$—. A portion of the soda ash or sodium carbonate reacts with the permanent hardness imparting components as exemplified by calcium chloride —$CaCl_2$—, calcium sulfate—$CaSO_4$—, calcium nitrate—$Ca(NO_3)_2$—to form a certain amount of calcium carbonate —$CaCO_3$—. Some of the excess lime hydrate in turn reacts with the permanent hardness imparting components as exemplified by magnesium chloride—$MgCl_2$—and magnesium sulfate—$MgSO_4$—to form a certain amount of magnesium hydroxide —$Mg(OH)_2$—precipitate together with calcium chloride—$CaCl_2$—and calcium sulfate—$CaSO_4$—as by-products. Such by-products react in turn with another portion of the soda ash to form a further amount of calcium carbonate—$CaCO_3$—. Other of the excess lime hydrate in turn reacts with the magnesium carbonate—$MgCO_3$—, the by-product resulting from the reaction of other lime hydrate with the temporary hardness imparting component magnesium bicarbonate—$Mg(HCO_3)$—, to form more of the magnesium hydroxide — $Mg(OH)_2$—. Thus, this treatment results in the conversion of the temporary and permanent hardness imparting components into solid precipitates of calcium carbonate—$CaCO_3$—and magnesium hydroxide—$Mg(OH)_2$—. Should the water being treated have some iron and aluminum compounds dissolved therein these compounds would be precipitated as iron and aluminum hydroxides.

From the mixer 1 the water carrying precipitates of both calcium carbonate and magnesium hydroxide in suspension together with some lime hydrate is conveyed through line 13 into a flocculation tank 2 or a series of such tanks. Preferably, such tank or tanks are of the type known by the trade-name "Flocculator" and made by The Dorr Company Inc., New York, N. Y. While in the flocculation tank, the water is subjected to the action of slow moving paddles for a sufficient time as to cause the segregation of the suspended particles of each of the calcium carbonate and magnesium hydroxide precipitates as to form flocked particles of a character which upon subsequent sedimentation are readily separable from the effluent.

After flocculation, the water is introduced through the line 14 into a sedimentation tank or primary classifier 3 wherein it is permitted to remain for a sufficient time to enable the flocked particles of the calcium carbonate and magnesium hydroxide precipitates to settle out and collect as a sludge or slurry upon the bottom of the tank or classifier.

Upon completion of the period of sedimentation in the tank or classifier 3, the water in a substantially non-turbid state is withdrawn from the launder 15 at the top of said tank and is conveyed through the line 16 into a carbonator 4 which is supplied with carbon dioxide gas through the line 17 from the stack 18 containing a source of $CO_2$ supply. In the carbonator the water is brought into intimate contact with the carbon dioxide and this contact continues until all of the lime hydrate which may be present therein as a result of being carried over from the mixer 1 has been completely neutralized. This carbonation treatment results in the precipitation of more calcium carbonate.

The water upon completion of the carbonation treatment is conveyed through the line 19 into a second flocculation tank 5, or series of such tanks, wherein it is subjected to a flocculation treatment. This treatment is carried out in the same type of tank and in the same manner as previously described in connection with flocculation tank 3 as to produce flocked particles of calcium carbonate readily separable out of the water upon sedimentation.

From the second flocculation tank 5, the water is discharged through the line 20 into a second sedimentation tank or secondary classifier 6 in which it is allowed to remain until the flocked precipitate particles of calcium carbonate settle out and collect upon the bottom of the tank or classifier. The thus treated or softened water, essentially free from turbidity, is withdrawn from the tank or classifier 6 through the launder 21 at the point indicated by the numeral 22 and conveyed from such point to filters and thence through municipality distributing pipes for use by users.

The sludge or slurry containing the flocked precipitates of both calcium carbonate and magnesium hydroxide which has collected upon the bottom of sedimentation tank 3 is withdrawn from such tank through the line 23. The sludge containing the flocked calcium carbonate precipitate in the sedimentation tank 6 is withdrawn therefrom through the line 24 and is conveyed through such line into line 23 wherein it is mixed with the previously mentioned sludge. The thus mixed sludge is introduced through the line 26 into a centrifuge 7 of the continuous type wherein the precipitate containing calcium carbonate is caused to be separated from the sludge.

A centrifuge suitable for the purpose of effecting the desired separation of the calcium carbonate precipitate from the sludge should comprise a solid bowl, a truncated rotor operating therein, means for driving said rotor at a speed such as to induce centrifugal forces of such magnitude and intensity as to throw out from a liquid containing suspended solids those solids to be fractionated for rejection in a state substantially devoid of the suspension liquid against the surface of the bowl, rejection conveying means for withdrawing from the sphere of centrifugal forces such solids deposited against the bowl surface as fast as they are so deposited so that they will not become again resuspended prior to conveyance to rejection, and means for discharging the resulting effluent. In other words, the centrifuge employed should be capable of inducing centrifugal forces of a magnitude and intensity as to classify and reject from a liquid containing suspended solids being treated those suspended solids or particles whose size are oversize or larger than those desired to remain in the liquid in a state substantially devoid of the suspension liquid, and being capable of withdrawing from the sphere of centrifugal forces such solids as fast as they are separated so as to avoid resuspension. A type of centrifuge that satisfies this description and the requirements of this invention are shown in the patent to Laughlin 1,710,315, granted April 23, 1929. Thus, the term "centrifugal forces of such magnitude and intensity" as used hereinafter and in the claims refers to such forces obtained in a centrifuge of the above defined structure and function.

In the centrifuge 7, the sludge or slurry containing particles of calcium carbonate and magnesium hydroxide precipitates is subjected to centrifugal forces of such magnitude and intensity as to cause that portion of calcium carbonate containing particles whose size is larger than those desired to be retained in suspension in the sludge to be separated out in a state sufficiently devoid of effluent as to collect in the form of a cake in the centrifuge. The particles constituting the thus separated portion are essentially those of the calcium carbonate precipitate admixed with a small amount of those smaller sized magnesium hydroxide containing particles which have been carried over by virtue of becoming attached or associated with the larger or oversize calcium carbonate containing particles. As the water initially treated contained some soluble iron and aluminum compounds, hydroxide precipitates of these metals are also present in the separated portion in small amounts, but the particles constituting each of such precipitates are of a size substantially similar to those of the magnesium precipitate. The effluent contains the magnesium hydroxide containing particles and that portion of the smaller sized particles of the calcium carbonate precipitate which have been rejected for classification in the cake, the magnesium hydroxide particles being present in the predominating amount. Also, in such effluent are the larger proportion of both the iron and aluminum hydroxide precipitates contained in the sludge. Thus, the subjection of the sludge to such centrifugal forces results in the segregation of the calcium carbonate containing particles constituting a concentrate in the cake with the aforementioned small amount of magnesium hydroxide carried therewith or remaining therein and of the magnesium, iron, and aluminum precipitate particles in the effluent, to wit, in the form of metallic hydroxides and of which the hydroxide particles constitute a concentration in the solids fraction of the resulting effluent suspension.

The cake or separated portion comprising the larger sized particles of the calcium carbonate containing precipitate is discharged from the centrifuge 7 through the line 27 and is conveyed through such line to a kiln 8. The effluent is withdrawn from the centrifuge through the line 28 and is discarded as waste.

A typical example illustrating the manner in which the various constituents of the sludge separate upon being centrifuged is shown by the following data:

1. *Chemical analysis, centrifuge feed and products*

|  | Ca | Mg | $R_2O_3$ —Fe R—Al | HCl insoluble |
|---|---|---|---|---|
|  | Per cent | Per cent | Per cent | Per cent |
| Feed solids | 33.82 | 2.13 | 2.24 | 2.30 |
| Effluent solids | 23.94 | 6.75 | 8.36 | 3.99 |
| Cake solids | 35.66 | 1.17 | 0.96 | 2.04 |

2. *Per cent distribution of constituents*

|  | Total solids | Ca | Mg | $R_2O_3$ | HCl insoluble |
|---|---|---|---|---|---|
|  | Per cent | Per cent | Per cent | Per cent | Per cent |
| Feed | 100 | 100 | 100 | 100 | 100 |
| Effluent | 15 | 11 | 50 | 60 | 26 |
| Cake | 85 | 89 | 50 | 40 | 74 |

From the foregoing data it will be seen that while 89% of the calcium is recovered as centrifuge cake only 50% of the magnesium and 40% of the $R_2O_3$ is so recovered. As the effluent products are discarded from the system the objectionable magnesium and $R_2O_3$ compounds are eliminated. However, since some of the magnesium and $R_2O_3$ compounds are present in the centrifuge cake, they will circulate in the system and build up until the amount discarded in the centrifuge effluent is equal to that quantity introduced with the untreated water. A balanced system will then be established which can be operated with substantially no variation in conditions. Since more lime will be produced than is required for subsequent reuse due to the recovery of the calcium from the untreated water some lime will have to be discarded. This will also assist in maintaining a balance of inert materials.

It is to be noted that magnesium oxide as well as the oxides of iron and aluminum are chemically inert as regards the water softening reactions. Hence, if the sludge were subjected to calcination without first being caused to undergo the centrifugal classification resulting in the concentration of the magnesium hydroxide and the hydroxides of iron and aluminum in the effluent herein above described, the resulting product would contain calcium oxide having the oxides of magnesium, iron, and aluminum associated therewith. If all of such product were introduced into the system as the source of lime for reuse, these inert oxides would eventually build up in the system until in time the closed circuit would be rendered inoperative.

In the kiln 8 the cake withdrawn from the centrifuge is subjected to a calcination treatment. Such treatment involves the heating of the cake to an elevated temperature in the presence of air for a sufficient time to convert the calcium carbonate into lime or calcium oxide and liberate carbon dioxide gas. The magnesium hydroxide included with the cake together with any iron and aluminum hydroxides that are present are likewise converted into the oxides. The liberated carbon dioxide gas is discharged from the kiln through the pipe 29 into the stack 18. Any excess of cake over that required for use in the kiln treatment may be withdrawn from the system at the point indicated by the numeral 30.

From the kiln 8, the calcined or burned lime cake is discharged into the line 31 and is conveyed through such line into line 34. From the line 34 it is introduced into a slaker 9. Untreated water for slaking of the cake is introduced from the diverting line 32 into the slaker through the line 33. Any excess of the lime cake over that required for treatment in the slaker may be withdrawn from the line 34 at the point indicated by the numeral 35.

The slaker 9 should preferably be of the type which includes a classifier mechanism as a part thereof. Such mechanism serves the purpose of eliminating any oversize particles that may have been formed in the system or have been introduced with the untreated water. The lime hydrate thus produced is discharged from the slaker through the line 12 and is conveyed through said line into the mixer 1 at the head of the system.

Although the invention has been described for the softening of water having hardness imparting components therein it is to be understood that it is also applicable to the treatment of any fluid of which water exists as the major part thereof and having impurities present of a similar nature.

Having thus described the invention, what is claimed as new and desired to be secured by Letters Patent is:

1. In the process for softening water, the step of subjecting the sludge containing particles of calcium carbonate and magnesium hydroxide precipitates suspended therein to centrifugal forces of such magnitude and intensity as to cause concentration of calcium carbonate containing particles in the solids fraction of the resulting cake and concentration of magnesium hydroxide containing particles in the solids fraction of the resulting effluent suspension.

2. In the process for softening water, the steps of subjecting the sludge containing particles of calcium carbonate and magnesium hydroxide precipitates suspended therein to centrifugal forces of such magnitude and intensity as to cause concentration of calcium carbonate containing particles in the solids fraction of the resulting cake and concentration of magnesium hydroxide containing particles in the solids fraction of the resulting effluent suspension, and calcining said cake to convert calcium carbonate thereof into lime suitable for use in the process.

3. In the process for softening water, the steps of subjecting the sludge containing particles of calcium carbonate and magnesium hydroxide precipitates suspended therein to centrifugal forces of such magnitude and intensity as to cause concentration of calcium carbonate containing particles in the solids fraction of the resulting cake and concentration of magnesium hydroxide containing particles in the solids fraction of the resulting effluent suspension, calcining said cake to convert calcium-bearing constituents thereof into lime, and slaking the thus formed lime with a slaking medium to form lime hydrate for use in the process.

4. The process of softening water containing dissolved calcium and magnesium components comprising mixing softening reagents including lime for causing conversion of certain calcium components into calcium carbonate precipitates and of certain magnesium components into magnesium hydroxide precipitates, subjecting the thus treated water to agitation favorable to develop such precipitates into flocculated particles, subjecting said water containing the flocculated particles to sedimentation to effect deposition thereof as sludge comprising insoluble calcium carbonate containing particles and magnesium hydroxide containing particles, subjecting said sludge to centrifugal forces of such magnitude and intensity as to cause concentration of calcium carbonate containing particles in the solids fraction of the resulting cake and concentration of magnesium hydroxide containing particles in the solids fraction of the resulting effluent suspension.

5. The process according to claim 4 and in which there is a calcining of said cake to convert calcium-bearing constituents thereof into lime suitable for use in the process.

6. The process according to claim 4 and in which there is a calcining of said cake to convert calcium-bearing constituents thereof into lime and slaking said lime with a slaking medium to form lime hydrate for use in the process as a constituent of the softening reagents.

7. A system for softening water comprising, in combination, a hard water supply means, means for feeding lime to the supplied water, flocculation apparatus wherein the lime-dosed water is subjected to flocculation to effect the formation of flocked particles of insoluble calcium carbonate and magnesium hydroxide precipitates, a settling apparatus wherein the water containing the flocculated particles is subjected to sedimentation to effect a settling of the particles of insoluble calcium carbonate and magnesium hydroxide precipitates in the form of a sludge, a centrifuge, means for withdrawing sludge from the settling apparatus and for delivering it to said centrifuge wherein the sludge is subjected to centrifugal forces of such magnitude and intensity as to cause a segregation of the calcium carbonate containing particles in a resulting cake and of magnesium hydroxide containing particles in the solids fraction of the resulting effluent suspension.

8. A system according to claim 7 having a kiln in which the cake is calcined to convert calcium carbonate thereof into lime suitable for use in the system.

9. A system according to claim 7 having a kiln in which the cake is calcined to convert calcium carbonate thereof into lime, a slaker wherein lime is treated with a slaking medium to convert it into lime hydrate and means for conveying the lime hydrate from the slaker and delivering it into the supplied water for re-use in the system.

10. In a process of softening water and the treatment of sludge derived therefrom containing calcium-bearing constituents including at least calcium carbonate bearing particles and particles containing certain metallic hydroxides within a group consisting of iron hydroxide, aluminum hydroxide and magnesium hydroxide, the step which comprises subjecting such sludge to centrifugal forces of such magnitude and intensity as to cause concentration of calcium-bearing constituents in the solids fraction of the resulting cake and concentration of metallic hydroxide bearing particles in the solids fraction of the resulting effluent suspension.

ROBERT F. CLEMENS.